US012382205B2

(12) United States Patent
Rawson

(10) Patent No.: US 12,382,205 B2
(45) Date of Patent: Aug. 5, 2025

(54) DJ BOOTH

(71) Applicant: Smiley Boom Pty Ltd, Ngunnawal (AU)

(72) Inventor: Daniel Rawson, Hornsby (AU)

(73) Assignee: Smiley Boom Pty Ltd, Ngunnawal (AU)

(*) Notice: Subject to any disclaimer, the term of this patent is extended or adjusted under 35 U.S.C. 154(b) by 237 days.

(21) Appl. No.: 17/760,157

(22) PCT Filed: Feb. 3, 2021

(86) PCT No.: PCT/AU2021/050080
§ 371 (c)(1),
(2) Date: Aug. 4, 2022

(87) PCT Pub. No.: WO2021/155429
PCT Pub. Date: Aug. 12, 2021

(65) Prior Publication Data
US 2023/0018052 A1    Jan. 19, 2023

(30) Foreign Application Priority Data

Feb. 4, 2020   (AU) .............................. 2020100173
Sep. 11, 2020  (AU) .............................. 2020903263

(51) Int. Cl.
*H04R 25/00*    (2006.01)
*A47B 91/06*    (2006.01)
(Continued)

(52) U.S. Cl.
CPC .............. *H04R 1/028* (2013.01); *A47B 91/06* (2013.01); *E04H 1/12* (2013.01); *F21S 10/02* (2013.01);
(Continued)

(58) Field of Classification Search
CPC ........ H04R 1/025; H04R 1/028; H04R 27/00; H04R 5/02; A47B 2097/006; A47B 91/06; A47B 2200/0075
(Continued)

(56) References Cited

U.S. PATENT DOCUMENTS 2,063,224 A * 12/1936 Bowles .................. H04R 27/04
                                                312/239
2,893,808 A *  7/1959 Waterman .............. A47B 19/10
                                                312/316
(Continued)

FOREIGN PATENT DOCUMENTS

WO      2017059301 A1    4/2017

OTHER PUBLICATIONS

LG XBOOM 1800W Home Entertainment System w/Karaoke & DJ Effects Owner's Manual.
(Continued)

*Primary Examiner* — Phylesha Dabney
(74) *Attorney, Agent, or Firm* — Greenberg Traurig, LLP

(57) ABSTRACT

A DJ booth for use at events or functions including: a housing; the housing contains sound processing equipment and at least one loudspeaker; and the housing includes wheels at its base for moving the DJ booth across a ground surface. In some embodiments the housing has the outer appearance of a large tape cassette player and further includes a retractable gantry portion which has the appearance of a handle of the tape cassette player.

13 Claims, 4 Drawing Sheets

(51) Int. Cl.
- *E04H 1/12* (2006.01)
- *F21S 10/02* (2006.01)
- *F21V 21/34* (2006.01)
- *G10H 1/36* (2006.01)
- *H04N 5/782* (2006.01)
- *H04N 7/18* (2006.01)
- *H04R 1/02* (2006.01)
- *H04R 5/02* (2006.01)
- *H04R 27/00* (2006.01)
- *A47B 97/00* (2006.01)
- *F21Y 115/10* (2016.01)

(52) U.S. Cl.
CPC ............. *F21V 21/34* (2013.01); *G10H 1/361* (2013.01); *H04N 5/782* (2013.01); *H04N 7/18* (2013.01); *H04R 1/025* (2013.01); *H04R 5/02* (2013.01); *H04R 27/00* (2013.01); *A47B 2097/006* (2013.01); *A47B 2200/0075* (2013.01); *F21Y 2115/10* (2016.08)

(58) Field of Classification Search
USPC .......................................................... 381/386
See application file for complete search history.

(56) References Cited

U.S. PATENT DOCUMENTS

| | | | |
|---|---|---|---|
| 6,092,885 A * | 7/2000 | James | A47B 19/00 |
| | | | 312/249.8 |
| 2005/0259532 A1 | 11/2005 | Roman et al. | |
| 2006/0052167 A1 | 3/2006 | Boddicker et al. | |
| 2016/0189699 A1 | 6/2016 | Garet | |
| 2018/0277079 A1* | 9/2018 | Wilson, Jr. | G10H 1/46 |

OTHER PUBLICATIONS

International Search Report for International Application No. PCT/AU2021/050080, mailed Mar. 30, 2021, four (4) pages.

Written Opinion for International Application No. PCT/AU2021/050080, mailed Mar. 30, 2021, three (3) pages.

* cited by examiner

DJ BOOTH

TECHNICAL FIELD

The present invention relates to systems for use in providing music and entertainment at events or functions and particularly relates to systems used by DJs.

BACKGROUND TO THE INVENTION

At events or functions it is common for music and entertainment to be provided by way of a mobile DJ service whereby sound and lighting systems are temporarily installed at the location of the event. When a mobile DJ sets up their equipment, they typically need to set up a folded trestle table, lights, speakers, stands, cables etc. They then set up the table area with a tablecloth and take the time to present a neat setup. They need to connect and setup their DJ equipment, plugging in cables and repeat the opposite process packing down at the end of the night, making multiple trips to and from their van, late in the evening after the guests have left the event.

There remains a need to provide improved ways of providing mobile DJ services at events or functions.

SUMMARY OF THE INVENTION

In a first aspect the present invention provides a DJ booth for use at events or functions including: a housing; the housing contains sound processing equipment and at least one loudspeaker; and the housing includes wheels at its base for moving the DJ booth across a ground surface.

The at least one loudspeaker may be removably stored inside the housing.

The DJ Booth may further include at least one sound source.

The at least one sound source may include a DJ turntable.

The sound processing equipment may include a mixer.

The sound processing equipment may include a sampler.

The sound processing equipment may include an amplifier.

The DJ booth may include a lighting system.

The lighting system may be sound activated.

The DJ booth may include an outwardly facing display screen.

The DJ booth may include an overhead gantry portion to which are mounted either lights or speakers.

The gantry portion can be moved between an extended position and a retracted storage position.

The DJ booth may have the outer appearance of a large tape cassette player.

In a second aspect the invention provides a DJ booth including: a housing; the housing has the outer appearance of a large tape cassette player.

The DJ booth may include one or more graphic panels and visual elements of the tape cassette player are depicted on the panels.

The DJ booth may further include a retractable gantry portion which has the appearance of a handle of the tape cassette player.

BRIEF DESCRIPTION OF THE DRAWINGS

An embodiment of the present invention will now be described, by way of example only, with reference to the accompanying drawings, in which.

DETAILED DESCRIPTION OF THE PREFERRED EMBODIMENT

Figure 1:
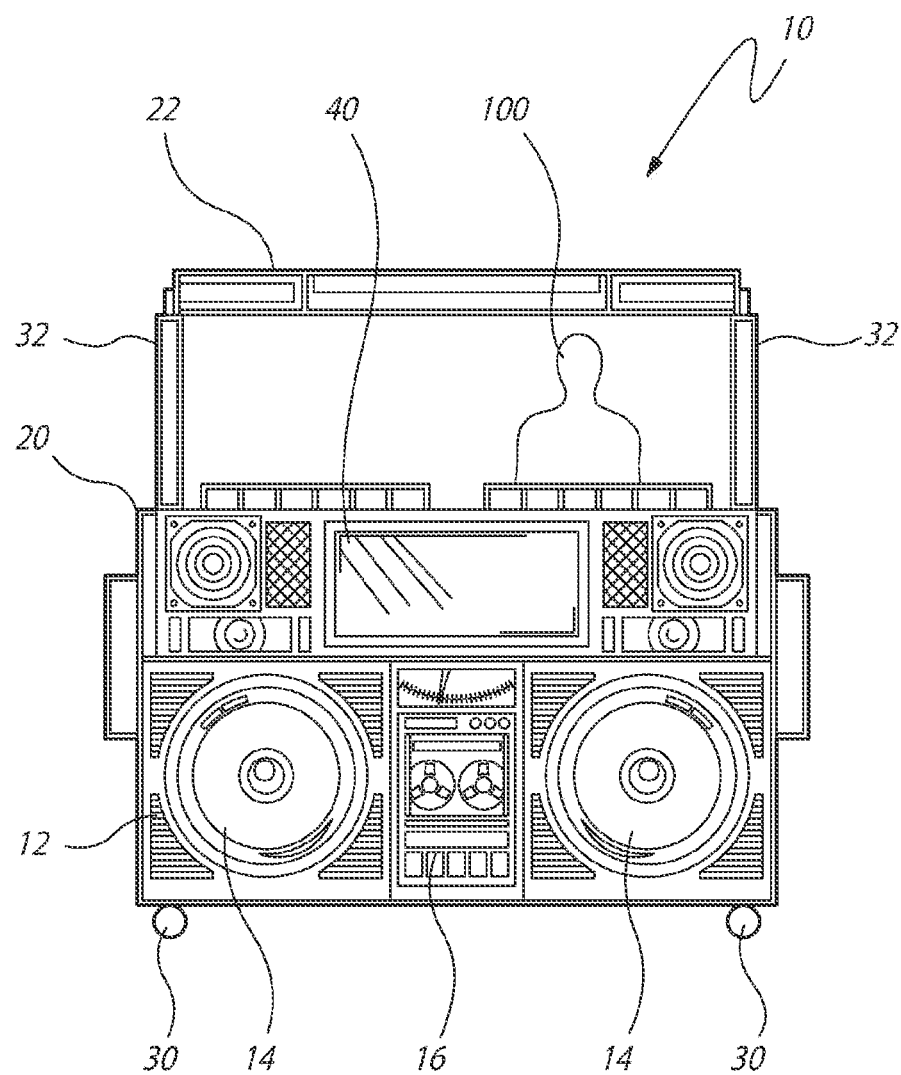
FIG. 1 is a front view of a DJ booth.

Referring to FIG. 1, a DJ booth 10 for use at events or functions is shown. The booth 10 is constructed to have the outer appearance of a large tape cassette player, otherwise known as a boombox. The booth 10 includes a housing which is defined by a frame 20 which is formed from lengths of square cross section mild steel (see FIGS. 2 and 3). A large graphic panel 12 is applied to the front of the frame on which are printed various components of a boom box including speakers 14, and a tape cassette deck 16. The sides of the frame are also fitted with panels (not shown) which are printed with graphics depicting the sides of the tape recorder. Lockable swivel castor wheels 30 are provided at each corner of the base of the frame 20 to enable to the booth 10 to be wheeled around to move the booth from place to place. The wheels are lockable to prevent the booth from unintentional movement once it is in place at a venue.

Frame 20 includes a moveable overhead gantry portion 22 which gives the appearance of the handle of the boombox. The gantry can be used to mount lights or speakers.

In the illustrated embodiment, the "speakers" 14 are graphic elements having the appearance of speakers. They are non functioning. The graphic speaker elements may be recessed inside the front face of the housing and covered by a clear protective panel to give a more realistic appearance of a speaker and may have inlaid LED lighting modules to provide for lighting effects. Other multi-coloured LED lighting modules are mounted at locations on the housing and may be sound activated. In other embodiments, functioning speakers may be used in combination with graphic panel 12 to contribute to the visual appearance of the DJ booth.

Figure 4:
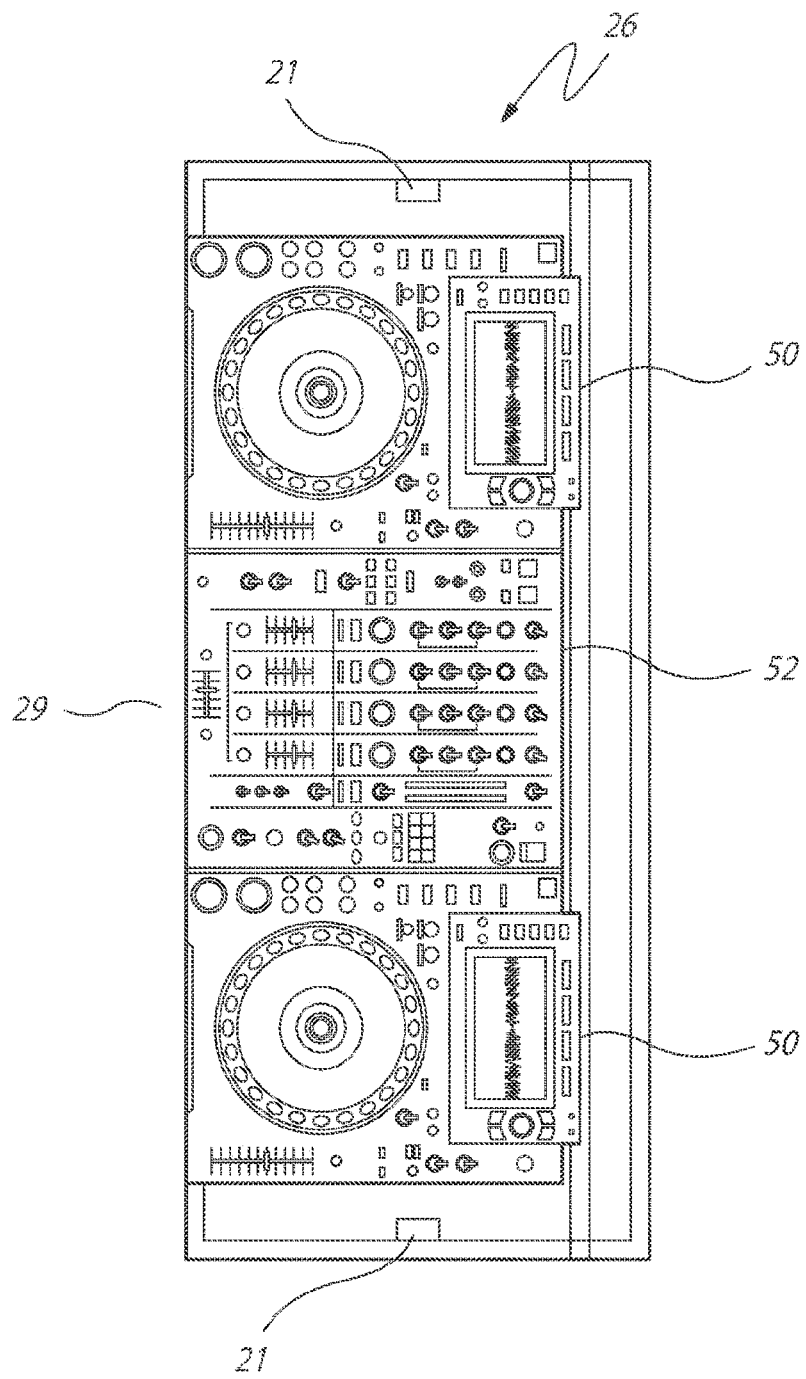
FIG. 4 is a top view of the frame with DJ equipment installed.

The housing contains sound sources in the form of two Pioneer CDJ2000 DJ turntables 50 and a sampler/mixer in the form of a Pioneer DJM900 52 (see FIG. 4). These are screw mounted to the frame to keeping them plugged in and secure. The DJ turntables and mixer are mounted at about waist height and are accessible from the rear side of the housing. A human FIG. 100 representing the DJ is shown in the DJ booth for scale.

Alternative sound sources may also be provided in the form of wireless microphones (for karaoke use), or audio and/or visual media stored on a device or memory stick, or streamed from the internet.

Mid-range and high frequency speakers 32 are mounted to the side arms of the handle portion 22 on either side of the booth. Subwoofer speakers (not shown) are installed underneath the DJ table and behind the external face of the graphic panel 12. Should more speakers be required, such as for at larger events, then additional speakers (not shown) can be deployed and connected via XLR outputs provided on either side of booth 10. The additional speakers may be set on stands at a distance away from the booth. The additional speakers and stands may be stored inside the housing of the booth before and after use.

A display screen in the form of an embedded LED monitor 40 is mounted at the front face of the housing. The monitor 40 can be used to display company logos, event logos, photo slideshows as part of a Karaoke party. It may also display sound activated visualisations to accompany the sound that is output by the device.

The booth includes a computing device mounted in the housing which is pre-configured with karaoke, music and video software built and installed into each booth giving the operator full access to software which can be used to control the operations of the booth, to select music playlists, and control lighting and display functions of the booth.

In some embodiments the LED monitor may have a touch sensitive screen for events that do not require a DJ/Operator. The touch screen can be used by party guests or organisers to access music playlists or karaoke options.

In some embodiments, a 2nd TV Display may be provided for karaoke parties. This can be set a short distance away from the booth 10 so that the singers can perform facing the crowds and the crowds can follow along reading the lyrics facing the performer with the first karaoke display on the front of booth 10 at the same time.

In some embodiments, the sound source DJ equipment may be omitted for users who feel more comfortable using their own equipment.

All of the electronic equipment and components housed in the DJ booth are hard wired to fixed powerboards mounted inside the housing which allows it to have only one output source of power making it neat and tidy and prevents and hazards. All of the devices are powered by connecting a mains outlet of the DJ booth to mains power. The speakers are the only additional equipment needed to set up.

Figure 2:
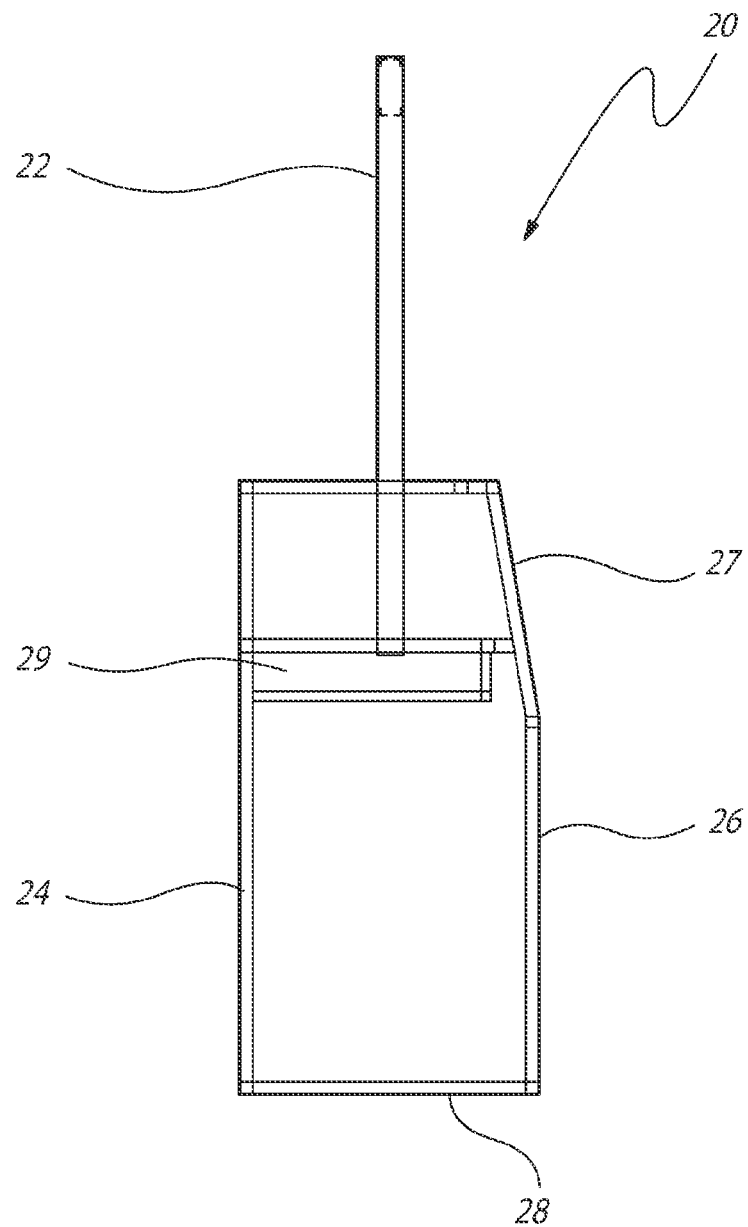
FIG. 2 is a side view of the frame of the DJ booth of FIG. 1.

Referring to FIG. 2, frame 20 is shown in isolation. The upright members of the overhead gantry "handle" portion 22 are received in larger box section tubes 21 (see FIG. 4) which are welded to the frame. This enables the handle to be moved between an extended position (as shown in FIG. 2) and a retracted position for more compact storage and transport.

The rear of the frame is formed by upright sections 24. The front of the housing is formed from upright sections 26 and the angled sections 27 define the region where the LED tv 40 is mounted. An area of the frame 29 is dimensioned for attaching the DJ turntables and mixer.

Figure 3:
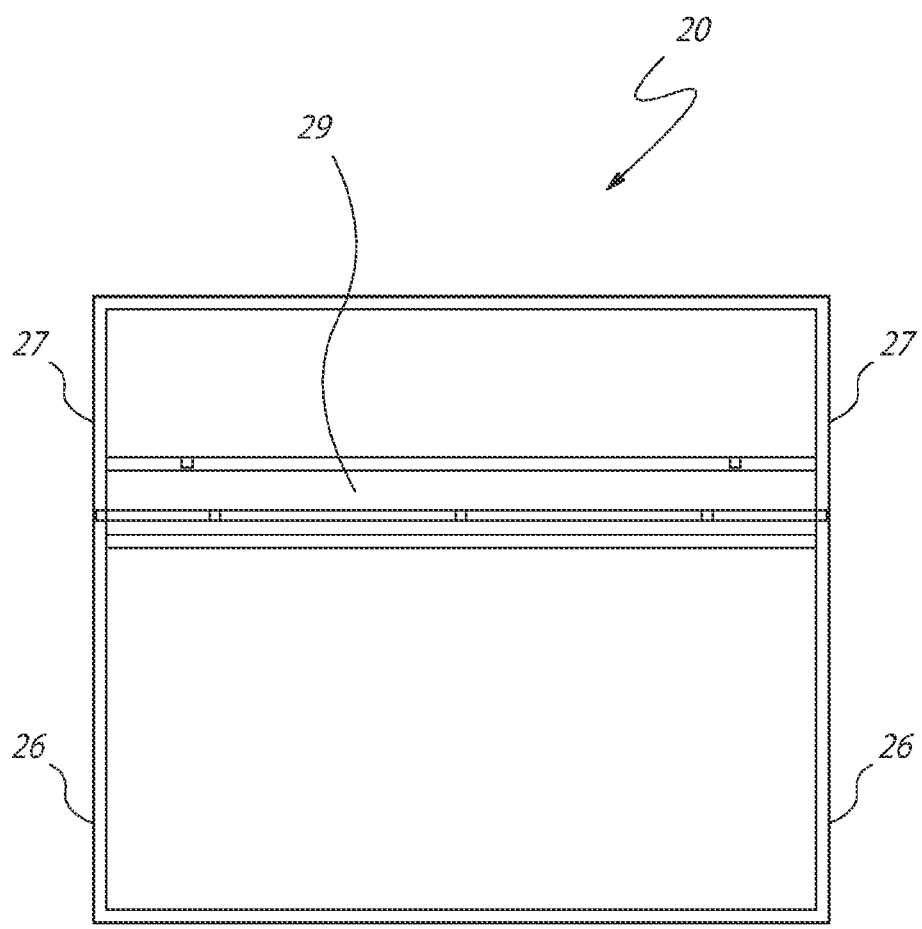
FIG. 3 is a rear view of the frame of FIG. 2.

Referring to FIG. 3 frame 20 is shown with handle 22 removed.

Referring to FIG. 4, frame 20 is shown from above with DJ equipment installed in region 29.

The DJ booth 10 can be transported to venues for easy setup and easy access. It can be transported inside a trailer or a van and then unloaded by way of a ramp and rolling the unit down the ramp on its wheels 30.

It can be seen that embodiments of the invention have at least one of the following advantages:

The DJ booth is a fully self-contained system for providing music and entertainment at events and is easy to transport, setup and use by any mobile DJ. The setup and pack down time is under 10 minutes.

The DJ/operator does not need to make multiple trips to and from their van/trailer, lugging equipment, heavy lifting different size road cases, packing and unpacking equipment and unravelling cables.

Repeatedly plugging cables in and out of the DJ equipment over time (which in traditional setups can damage the equipment connections) is avoided by permanently mounting and connecting the equipment together.

The booth has the outer appearance of a large tape cassette player and thereby lends decoration and party styling to an event.

Any reference to prior art contained herein is not to be taken as an admission that the information is common general knowledge, unless otherwise indicated.

Finally, it is to be appreciated that various alterations or additions may be made to the parts previously described without departing from the spirit or ambit of the present invention.

The invention claimed is:

1. A DJ booth for use at events or functions including:
a housing;
the housing contains sound processing equipment and at least one loudspeaker;
the housing includes wheels at its base for moving the DJ booth across a ground surface; and
an overhead gantry portion to which are mounted either lights or speakers, wherein the gantry portion is movable between an extended position and a retracted storage position.

2. The DJ booth according to claim 1 wherein the at least one loudspeaker is removably stored inside the housing.

3. The DJ booth according to claim 1 further including at least one sound source.

4. The DJ booth according to claim 3 wherein the at least one sound source includes a DJ turntable.

5. The DJ booth according to claim 1 wherein the sound processing equipment includes a mixer.

6. The DJ booth according to claim 1 wherein the sound processing equipment includes a sampler.

7. The DJ booth according to claim 1 wherein the sound processing equipment includes an amplifier.

8. The DJ booth according to claim 1 which includes a lighting system.

9. The DJ booth according to claim 8 wherein the lighting system is sound activated.

10. The DJ booth according to claim 1 which includes an outwardly facing display screen.

11. The DJ booth according to claim 1 which has an outer appearance of a tape cassette player.

12. A DJ booth including:
a housing;
the housing having an outer appearance of a tape cassette player; and
a gantry portion which has an appearance of a handle of the tape cassette player, wherein the gantry portion is movable between an extended position and a retracted storage position.

13. The DJ booth according to claim 12 including one or more graphic panels and visual elements of the tape cassette player are depicted on panels of the housing.

* * * * *